Patented July 31, 1951

2,562,393

UNITED STATES PATENT OFFICE 2,562,393

PRODUCTION OF KETONIC BODIES

Walter Reppe, Ludwigshafen-on-the-Rhein, and August Magin, Mutterstadt/Pfalz, Germany No Drawing. Application February 9, 1950, Serial No. 143,361. In Germany October 1, 1948

8 Claims. (Cl. 260—533)

The present invention relates to the production of ketonic bodies, and, more particularly, to the production of aliphatic unsaturated or saturated compounds containing at least one keto group and, eventually, in addition thereto carboxylic acid groups, hydroxy groups or functional groups derived therefrom. It is an object of the present invention to prepare these compounds from the cheapest and most readily available basic materials, i. e. carbon monoxide and acetylene or other compounds of the acetylene series.

We have found, and this constitutes an object of our invention, that ketonic bodies are formed by causing carbon monoxide and water to act on acetylenes which definition includes also compounds of the acetylene series at elevated temperature and under increased pressure in the presence of certain catalysts.

While it is known that certain metals, in particular those capable of forming carbonyls, or their compounds may be used for the addition of carbon monoxide and water to the acetylenic linkage under the formation of acrylic acids, we have now found that the cyanides of these metals, when used in the interaction of the above mentioned three components direct the reaction mainly another way. The most active catalysts of this type are the complex cyanides of nickel, e. g. the so-called "Belucci" salt $K_2[Ni^ICy_3]$, potassium tetracyanoniccolate $K_2[Ni^{II}Cy_4]$ or the corresponding complex salts of other alkali metals such as sodium or lithium, or of alkaline earth metals such as calcium, barium, and magnesium, or of other bivalent metals, such as zinc, cadmium or mercury, or of ammonia as well as the ammine compounds. Most suitable catalysts are such complex nickel cyanides as are capable of forming addition compounds with carbon monoxide or acetylene wherein the linkage is reversible or the carbon monoxide or acetylene is exchangeable with compounds containing cyano groups. Instead of the ready-made complex compounds we may also use compounds capable of forming such complex compounds, e. g. mixtures of metal cyanides and nickel-II-cyanide.

The catalyst defined above may be used in a state of dissolution or suspension. They may also be applied to the conventional carrier substances, such as aluminum oxide, silicic acid gel or pumice stone.

Without committing ourselves to a definite theory of the course of reaction involved in the process of our invention, we may assume that the acetylene and the carbon monoxide are forming a more or less stable addition compound in the first stage which shall be illustrated in the most simple case as a formation of the hypothetic cyclopropenone (1) 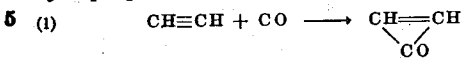

When further assuming that this addition compound will react with itself in the form of a bivalent radical, compounds should be formed which contain a plurality of the basic starting materials, viz, carbon monoxide and acetylene. This second stage may be illustrated by the following equation:

(2) 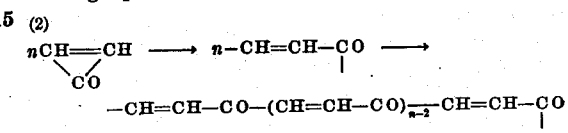

wherein $n$ represents a whole number of at least 2.

Depending on the reaction conditions, the chain being formed will be interrupted earlier or later by that the water taking part in the reaction, or eventually the hydrogen formed acocrding to a secondary reaction (3) $CO + H_2O \rightarrow CO_2 + H_2$ will add at the ends of the chain, which may be illustrated by the following equations:

(4) 

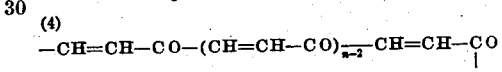

(5) 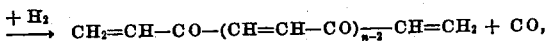

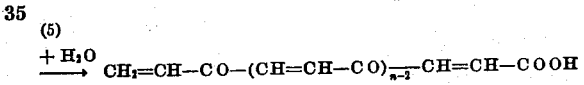

The adding of hydrogen thus should lead to the formation of ketones and eventually keto alcohols, whereas the addition of water should lead to the formation of keto carboxylic acids. Another reaction which may occur is the reaction between the cyclopropenone and water according to the following equation:

(6) 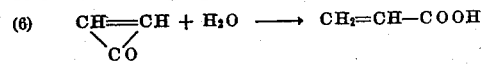

This unsaturated acid may react with carbon monoxide and water to form a dicarboxylic acid (7) $CH_2=CH—COOH + CO + H_2O \rightarrow$
$HOOC—CH_2—CH_2—COOH$ As it is to be expected, derivatives of the primary reaction products, e. g. esters or cyclic ketones formed by condensation reactions, may also be found as reaction products. Part of the hydrogen may also be used up for saturating the olefinic linkages of the reaction products.

Generally speaking, we may use as starting materials any compounds containing an acetylenic linkage, i. e. a triple linkage between two aliphatic carbon atoms. Hydrocarbons of the acetylene series, such as methyl-, iso-propyl-, vinyl- and divinyl-acetylene, phenyl- and diacetylene and their homologues, are the most suitable initial materials. Acetylenes containing substituents, e. g. propargyl alcohol, butinol, butinediol, hexadiinediol, aminopropines and -butines or carboxylic acids of the acetylene series may also be used.

We prefer to carry out the process according to the present invention at moderately elevated temperatures, in particular at from 60 to 100° C., but temperatures between 100 and 200° C. may also be used. When working at lower temperatures within this preferred range higher molecular products, in particular polyketones and polyketo carboxylic acids, are preferably formed, whereas at higher temperatures, probably owing to a favored formation of hydrogen according to Equation 3, relatively low molecular products are produced. We may also obtain higher molecular products at comparatively high temperatures, say in excess of 100° C., provided that the contact time is shorter which may be achieved by allowing the starting materials to react according to the trickling process.

The nature of the reaction products also depends on the pressure applied. Generally speaking, we prefer to work with a carbon monoxide pressure of at least 5 atmospheres, preferably of 10 to 20 atmospheres, so that the total pressure is preferably between 10 and 40 atms., provided an equimolecular ratio between carbon monoxide and acetylene is employed. When using another ratio or other acetylene compounds the partial carbon monoxide pressure may be higher or lower, while the partial acetylene pressure should, for safety reasons, not exceed 25 atms.

The reaction may be carried out according to the batch method in high pressure vessels or continuously, e. g. to the counter- or direct-current process with rigidly arranged catalysts while circulating the carbon monoxide or the carbon monoxide-acetylene mixture. When using such circulation, the carbon dioxide formed according to Equation 3 is preferably eliminated prior to reintroducing the carbon monoxide into the process. We may also work in the liquid phase with dissolved or suspended catalysts, if desired, while circulating acetylenes and carbon monoxide through the liquid.

Generally speaking, we prefer to use the water taking part in the reaction as a solvent, but we may also add other solvents, such as organic oxygen-containing solvents miscible with water, e. g. ethers or ketones or even saturated hydrocarbons, especially when using higher molecular acetylenes as initial materials. The use of these additional solvents may attribute to the formation of higher molecular reaction products instead of lower molecular ones. We may also dilute the gases taking part in the reaction. They may contain nitrogen, methane, or other gases. We may also use technical gases, such as water gas, or generator gas, or electric arc acetylene. The ratio between carbon monoxide and acetylene may vary to a large extent.

As already stated, reaction products of varying molecular weight may be formed depending on the reaction conditions. These, in turn, may be varied by changing the temperature, the pressure, the time of contact, the pH value, the type of catalyst, the CO:acetylene ratio, and so on. It has been observed that neutral reaction products, i. e. products containing no free carboxylic acid groups, are favored by using an excess of acetylene, whereas keto carboxylic acids are preferably formed when using the carbon monoxide in excess. When working within an alkaline pH range which may be achieved by the addition of alkali metal carbonates, e. g. soda, potash, lime, or amines, the formation of low molecular ketones or keto carboxylic acids is favored as compared with the working in neutral medium.

As to the nature of the reaction products formed according to our present invention it may be stated that the high molecular products are either polyketones or polyketo carboxylic acids, insoluble or sparingly soluble in solvents, in addition to small amounts of high molecular secondary products. Lower molecular reaction products are soluble in organic solvents as a rule. The position of the keto groups is preferably in 1.4 with reference to each other. The process may even yield low molecular products, such as monoketones, mono- and di-carboxylic acids, and small amounts of esters. Part of the substances we have found in the products of our process have hitherto been unknown or differently accessible. They may be used for the production of plastics or intermediates for various application fields, e. g. plasticizers, lacquers, resins, textile assistants or tanning agents. By further chemical reactions, e. g. hydrogenation, oxydation, dehydration, amination, or vinylation, they may be converted into mono- and polycarboxylic acids, alcohols, amines, derivatives of the furane or pyrole series, cyclic unsaturated or saturated ketones and so on.

The following example will further illustrate how our invention may be carried out in practice without restricting it to this example.

*Example*

A pressure-tight stirring vessel from stainless steel (conts. 5 liters) is charged with a solution of 240 grams of potassium nickel cyanide ($K_2[NiCy_4]$) in 1200 grams of water. The air is expelled by nitrogen, and 10 atmospheres of acetylene and 10 atmospheres of carbon monoxide are pressed in at room temperature. The vessel is then heated, while stirring, to about 100° C., and a mixture of equimolecular amounts of acetylene and carbon monoxide is replenished to maintain a pressure of about 25 atmospheres. After 40 hours about 150 atmospheres of this gas mixture have been consumed. The reaction mixture is allowed to cool and the pressure released, whereby 12 liters of acetylene, 16 liters of carbon monoxide, 20 liters of carbon dioxide, formed during the reaction, and small amounts of ethane are reclaimed.

The reaction product consists of a darkly colored solid and a dark-brown liquid. The solid is filtered off, and washed repeatedly with water. Thus, 162 grams of a solid pulverous product is obtained which is very sparingly soluble in organic solvents.

The liquid part of the reaction product and the water used for washing the solid contain the potassium salts of high molecular polyketo carboxylic acids which may be deposited as free acids, if desired after extracting small amounts

What we claim is:

1. A process for the production of ketonic compounds which comprises reacting a compound containing an acetylenic linkage with carbon monoxide and water in the presence of a cyanide of a metal capable of forming metal carbonyls at from 60° C. to 200° C. and at a total pressure of at least 10 atmospheres.

2. A process for the production of ketonic compounds which comprises reacting a compound containing an acetylenic linkage with carbon monoxide and water in the presence of a complex nickel-cyanide catalyst at from 60° C. to 200° C. and a total pressure of at least 10 atmospheres.

3. A process for the production of ketonic compounds which comprises reacting acetylene hydrocarbons with carbon monoxide and water in the presence of a complex nickel-cyanide catalyst at from 60° C. to 200° C. and a total pressure of at least 10 atmospheres.

4. A process for the production of ketonic compounds which comprises reacting acetylene with carbon monoxide and water in the presence of a complex nickel-cyanide catalyst at from 60° C. to 200° C. and a total pressure of at least 10 atmospheres.

5. A process for the production of ketonic compounds which comprises reacting acetylene with carbon monoxide and water in the presence of a complex alkali metal nickel-cyanide catalyst at from 60° C. to 200° C. and a total pressure of at least 10 atmospheres.

6. A process for the production of ketonic compounds which comprises reacting acetylene with carbon monoxide and water in the presence of a complex potassium nickel-cyanide catalyst at from 60° C. to 200° C. and a total pressure of at least 10 atmospheres.

7. A process for the production of ketonic compounds which comprises reacting acetylene with carbon monoxide and water in the presence of a complex potassium nickel-cyanide catalyst at from 60° C. to 200° C. and a total pressure of at least 10 atmospheres, the partial pressure of acetylene being from 5 to 25 atmospheres.

8. A process for the production of ketonic compounds which comprises reacting equimolar amounts of acetylene and carbon monoxide with about 1200 grams of water in the presence of about 240 grams of potassium nickel-cyanide at a temperature of about 100° C. and a pressure of about 25 atmospheres for about 40 hours.

WALTER REPPE.
AUGUST MAGIN.

REFERENCES CITED

The following references are of record in the file of this patent:

UNITED STATES PATENTS

| Number | Name | Date |
|---|---|---|
| 2,448,368 | Gresham et al. | Aug. 31, 1948 |
| 2,448,375 | Larson | Aug. 31, 1948 |
| 2,473,993 | Gresham et al. | June 21, 1949 |
| 2,510,105 | Hedberg | June 6, 1950 |

OTHER REFERENCES

Peck et al., "Interview with Dr. W. J. Reppe," Fiat Final Report No. 273, pp. 9–11 (Oct. 2, 1945).